Nov. 29, 1955  W. R. STREED ET AL  2,725,079
LINED FABRICATED PIPE FITTINGS
Filed April 15, 1953

INVENTOR.
WILLIAM R. STREED
OLOF V. STREED
BY
Jennings & Carter
ATTORNEYS

2,725,079

LINED FABRICATED PIPE FITTINGS

William R. Streed and Olof V. Streed, Sr., Gadsden, Ala.

Application April 15, 1953, Serial No. 349,062

4 Claims. (Cl. 138—64)

This invention relates to lined, fabricated pipe fittings and has for an object the provision of such fittings which shall be particularly adapted for conveying corrosive materials.

A further object of our invention is to provide a lined pipe fitting which shall embody a plurality of outer sections formed of sheet metal which encase a like number of inner sections formed of a non-corrosive material together with improved means for sealing the joints between the abutting ends of the inner sections.

A further object of our invention is to provide a pipe fitting of the character designated which shall embody improved means preventing axial movement of the inner and outer sections with respect to each other.

A still further object of our invention is to provide a lined pipe fitting of the character designated which shall be sturdy of construction, economical of manufacture and one which may be readily installed with a minimum of labor and materials.

A pipe fitting embodying features of our invention is illustrated in the accompanying drawing forming a part of this application in which.

Figure 1:
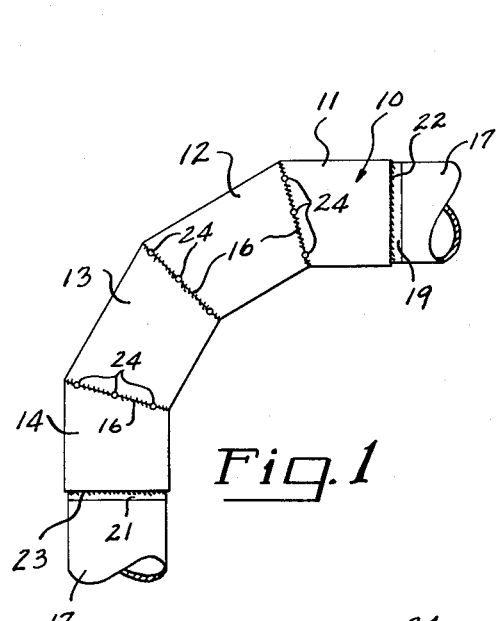
Fig. 1 is a side elevational view of an elbow fitting fabricated in accordance with my invention.

Referring now to the drawing for a better understanding of our invention, we show at 10 a sheet metal fabricated elbow fitting. The fitting 10 embodies a metal outer jacket made up of sections of pipe 11, 12, 13 and 14 cut and welded along the seams indicated at 16. Fitting within each of the sections 11, 12, 13 and 14 is a section of pipe 17 formed of a non-corrosive material, such as an asbestos cement mixture. A suitable such product is sold by Johns-Manville Company under the name of "Transite."

Figure 2:
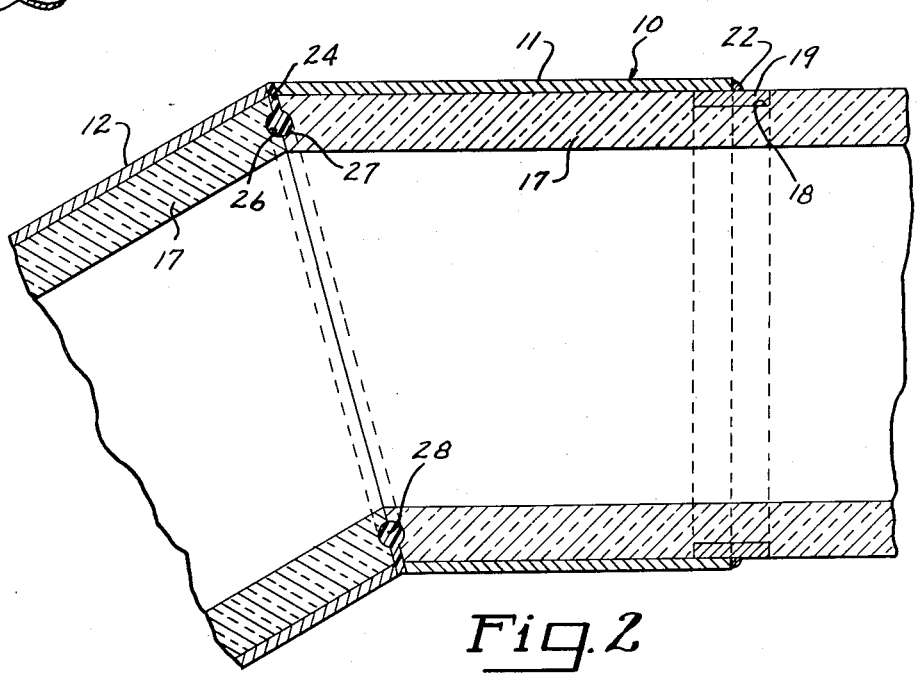
Fig. 2 is an enlarged fragmentary sectional view of the fitting shown in Fig. 1.

The sections of pipe 17 adjacent the ends of the metal sections 11 and 14 are provided with annular grooves 18 in the outer surface thereof for receiving metal rings 19 and 21. As shown in Fig. 2 a portion of the metal ring extends beneath the outer edge of the metal section. The ends of the sections 11 and 14 are secured to the rings 19 and 21 by any suitable means, such as by welding at 22 and 23.

In order to seal the joints between the abutting ends of the inner sections of pipe 17, we drill a plurality of small openings 24 through the metal outer jacket along the seams 16. The openings 24 are in communication with semi-cylindrical matched grooves 26 and 27 formed in the ends of the sections of pipe 17. When the ends of the sections of pipe 17 are brought into abutment with each other, as shown in Fig. 2, the semi-cylindrical grooves 26 and 27 form a continuous annular passageway around the fitting. A suitable sealing compound 28, such as a bitumastic sealing compound which hardens to some extent, is injected under pressure into the openings 24 thus filling the annular passageway at the abutting ends of the sections of pipe 17.

From the foregoing description the assembly of our improved lined pipe fitting will be readily understood. The inner sections of pipe 17 are placed within the outer metal jacket and the metal rings 19 and 21 which fit in the grooves 18 are welded to the outer ends of the sections 11 and 14 of the outer jacket. The sealing compound 28 is then injected under pressure to fill the openings 24 and the annular passageway formed by the semi-cylindrical grooves 26 and 27. The sealing compound not only seals the joint to prevent corrosive materials flowing in the pipe from contacting the metal jacket but also forces the sections of pipe 17 apart, thus forcing the sections 11 and 14 firmly against the rings 19 and 21. The rings therefore prevent undue axial shifting of liner sections.

Figure 3:
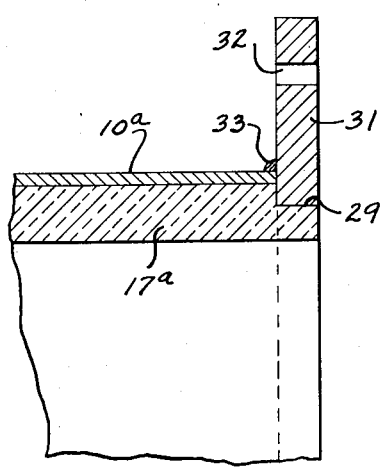
Fig. 3 is a fragmentary sectional view showing a modification.

In Fig. 3 we show a slightly modified form of the means for preventing axial shifting of the inner sections indicated at 17ᵃ, with respect to the outer metal jacket indicated at 10ᵃ. The outer end of the inner section 17ᵃ is reduced to form an annular recess 29 which extends around the pipe. Fitting in the recess 29 is an annular coupling flange 31 having bolt holes 32 therein. The coupling flange is secured to the outer end of the jacket 10ᵃ by any suitable means, such as by welding at 33. With the flange 31 secured to the jacket 10ᵃ, it serves as an abutment to hold the inner sections 17ᵃ against axial movement outwardly of the jacket.

From the foregoing it will be seen that we have devised an improved lined pipe fitting for conveying corrosive materials which is very sturdy of construction and economical of manufacture. By forming the annular passageway at the abutting ends of the inner sections of pipe, and filling the same with a sealing compound under pressure, a leak proof joint is formed and at the same time the outer ends of the sections of pipe 17 and 17ᵃ are forced into firm engagement with the rings and flanges respectively.

While we have shown our invention in but two forms, it will be obvious to those skilled in the art that it is not so limited, but is susceptible of various changes and modifications without departing from the spirit thereof, and we desire, therefore, that only such limitations shall be placed thereupon as are specifically set forth in the appended claims.

What we claim is:

1. In a lined pipe fitting, an outer jacket having a plurality of angularly disposed metal sections, a plurality of separately formed sections of cementitious pipe angularly disposed and abutting each other and forming a continuous inner lining for said outer jacket, means holding said inner lining against axial movement with respect to said outer jacket, there being an annular groove in at least one of the abutting ends of said sections of pipe forming a passageway between said abutting ends, and means for introducing a plastic sealing compound under pressure into said passageway from outside the fitting.

2. In a lined pipe fitting, a metal outer jacket embodying a plurality of sections, a plurality of separately formed section of cementitious pipe abutting each other and forming inner linings for said outer jacket, means carried by the outer jacket near the ends of the fitting holding said inner linings against axial movement with respect to said outer jacket, there being matched grooves in the abutting ends of said sections of pipe forming a passageway therebetween, and means for introducing a plastic sealing compound under pressure into said passageway after the jacket and lining are assembled.

3. In a lined pipe fitting, an outer jacket comprising a plurality of angularly disposed connected metal sections, a plurality of separately formed sections of cementitious pipe abutting each other and forming inner linings for said outer jacket sections, there being matched grooves in the abutting ends of said sections of pipe forming passageways therebetween, means introducing a plastic sealing compound under pressure into said passageways, annular grooves in said sections of pipe adjacent the outer ends of the fitting, metal rings fitting snugly in said grooves, and means securing said rings to said outer jacket, thereby holding the linings against axial movement relative to their associated jacket sections.

4. In a lined pipe fitting, an outer jacket, a plurality of sections of separately formed rigid pipe abutting each other and forming a continuous inner lining for said outer jacket, there being matched grooves in the abutting ends of said sections of pipe forming passageways therebetween, means for introducing a sealing compound under pressure into said passageways, annular recesses in said sections of pipe adjacent the outer ends of said outer jacket, coupling flanges in said recesses, and means securing said coupling flanges to said outer jacket.

References Cited in the file of this patent

UNITED STATES PATENTS

| | | |
|---|---|---|
| 1,041,290 | Hunt | Oct. 15, 1912 |
| 1,463,461 | Davis | July 31, 1923 |
| 1,666,799 | Trammell | Apr. 17, 1928 |
| 2,314,328 | Enderle | Mar. 23, 1943 |
| 2,451,145 | Baker et al. | Oct. 12, 1948 |
| 2,599,210 | Thompson | June 3, 1952 |